Aug. 25, 1964 H. R. LINDEN ETAL 3,146,131
APPLIANCE FOR PRODUCTION OF DIRECT ELECTRIC CURRENT
Filed March 20, 1961
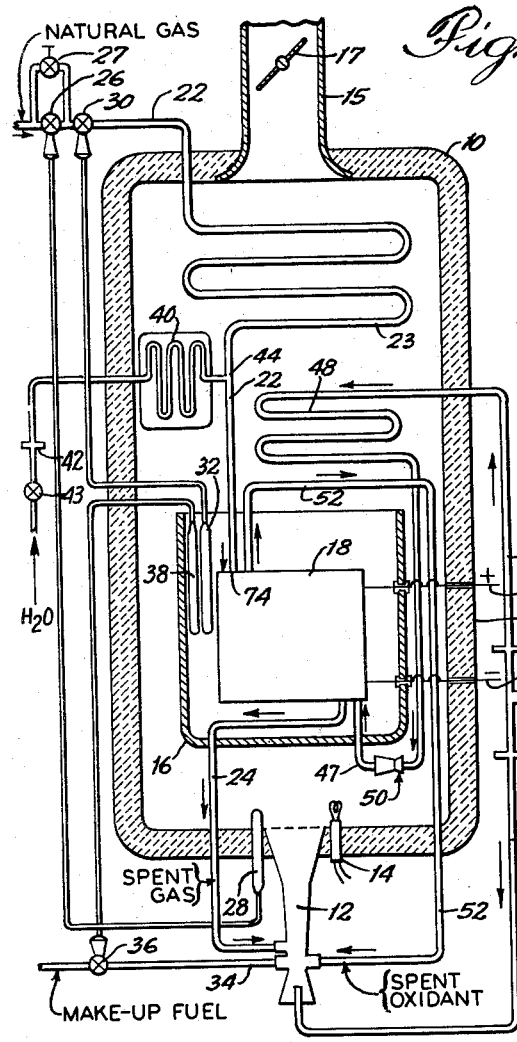
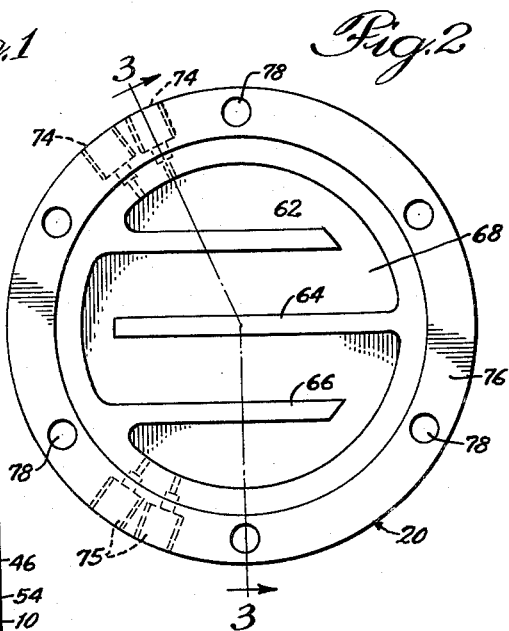
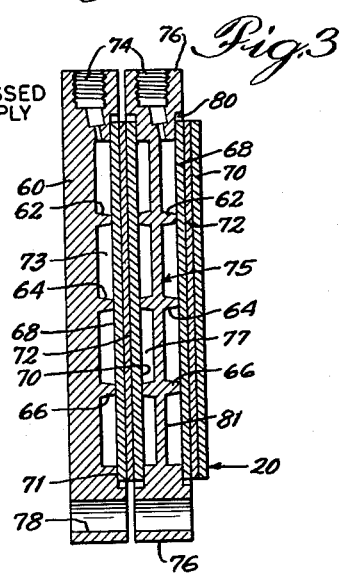
INVENTORS:
Henry R. Linden
and Eugene B. Shultz Jr.,
BY Bair, Freeman & Molinare
ATTORNEYS.

3,146,131
APPLIANCE FOR PRODUCTION OF DIRECT
ELECTRIC CURRENT
Henry R. Linden, Hinsdale, and Eugene B. Shultz, Jr., Chicago, Ill., assignors to Institute of Gas Technology, a corporation of Illinois
Filed Mar. 20, 1961, Ser. No. 96,877
7 Claims. (Cl. 136—86)

This invention relates to an apparatus and method for the direct generation of electricity from the energy released by the electrochemical oxidation of hydrocarbon fuels at elevated temperatures, say, 500° C. and higher. More particularly, it relates to an appliance comprising a battery of fuel cells and efficient means for supplying the fuel, oxidizing gas, carbon dioxide, steam, and the necessary heat to maintain the desired reaction temperature.

Fuel cells, with molten alkali carbonate electrolytes, preferably used in the appliance of this invention, have been demonstrated as an effective means for converting the chemical energy of such gases as hydrogen, carbon monoxide, and some of the higher paraffin hydrocarbons into electrical energy. These cells operate on the principle that the electrolyte serves to transport oxygen in ionic form from the cathode (air or oxygen electrode) to the anode (fuel electrode), where the fuel is oxidized to carbon dioxide and/or water vapor with the release of electrical energy. The method of oxygen transport through the electrolyte is by means of the anion $CO_3^=$, which results in the release of $CO_2$ when the oxygen is consumed. Thus, in the alkali carbonate electrolyte cell, carbon dioxide must be fed to the cathode in addition to oxygen to preserve the desired properties of the electrolyte; if no carbon dioxide were added, the carbonate salts would be converted to the corresponding oxides which do not have the necessary anion conductance.

When methane or natural gas is used as the fuel, steam is introduced with the gas so that the well known reforming reaction can take place in the presence of the porous metal electrode:

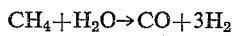

$$CH_4 + H_2O \rightarrow CO + 3H_2$$

The metal from which the electrode is made, such as nickel or cobalt, is an effective catalyst for this reaction at 600° to 900° C., the preferred temperature range for operation of the fuel cell. Hydrogen is a preferred fuel for these cells since the current densities obtainable are many times those obtainable with other fuels. In this connection it should be noted that the preferred composition and operating temperature of the anode of a molten carbonate fuel cell also permits considerable conversion of carbon monoxide to additional hydrogen by the well known shift reaction:

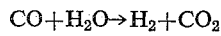

$$CO + H_2O \rightarrow H_2 + CO_2$$

Thus, by adding 2 moles of steam, or more, per mole of methane fed to a molten carbonate fuel cell it is possible to convert the methane at the anode into the preferred fuel—hydrogen—at a high rate and under circumstances favorable to the overall efficiency of the process. The overall reaction for conversion of methane with water vapor to hydrogen and carbon dioxide is quite endothermic, which means that the chemical energy content of the product hydrogen is higher than the chemical energy content of the methane. In a fuel cell, the energy required to achieve this conversion can be supplied from the heat release associated with the electrochemical oxidation of the fuel. This heat release is the result of the thermodynamic irreversibility of the oxidation reaction and the internal resistance of the cell. These two factors are primarily responsible for the difference between the electrical energy corresponding to the heating value (chemical energy) of the fuel and the actual electric energy output of the cell which is realized.

A primary object of the present invention is to provide an efficient process and apparatus or appliance comprising a battery of fuel cells in which the desired reaction temperature is maintained by burning unreacted fuel discharged from the battery; the reactants are preheated within the appliance itself; carbon dioxide required at the electrode is supplied from combustion gases resulting from burned fuel; and the reactants are supplied in the correct proportions.

Another object is to provide an appliance of this type which operates automatically utilizing only a conventional supply of utility fuel gas, and a supply of water and air.

Another object is to provide an improved fuel cell construction which provides a tortuous path over the electrode surfaces for the fuel and oxidizing gas streams, to minimize bypassing; assurance of mechanical and electrical contact between (a) the anode, (b) the porous refractory disk containing the molten electrolyte, (c) the cathode, and (d) the two halves of the cell body containing the gas inlets and outlets and baffles; a gas-tight seal between the fuel gas space and the oxidant gas space of the cell, as well as between the interior of the cell and the surrounding atmosphere; and ability to be assembled in any number by connecting the oxidant gas and fuel gas inlets and outlets in series to provide for countercurrent or cocurrent flow. These and other objects and advantages of the invention will become apparent from the following description when read in conjunction with the accompanying drawing, in which FIGURE 1 is a sectional view, semi-diagrammatic in nature, illustrating a preferred form of the appliance constructed in accordance with the present invention;

FIGURE 2 is a plan view partly in section of a fuel cell comprising part of the battery or power pack disposed within the appliance of FIGURE 1; and FIGURE 3 is a sectional view taken along the line 3—3 of FIGURE 2.

The appliance comprises a furnace 10 which may be cylindrical in shape. The walls are made from a suitable refractory material capable of withstanding temperatures as high as 1000° C. or more. There is nothing critical about the shape of the furnace except that it should provide sufficient space to house the battery of fuel cells and heat exchangers, as described hereinbelow. Extending through the bottom wall of the furnace we have provided a burner 12 for burning natural gas or other hydrocarbon fuel to maintain the interior of the furnace at a temperature between 500° C. and 900° C.

An igniter 14 is mounted in the furnace wall adjacent to the burner to facilitate ignition of the fuel. A plurality of burners arranged circumferentially if the furnace is cylindrical, or longitudinally if the furnace is rectangular, may be employed if required to supply the necessary heat. The single burner shown is merely illustrative of the type of burner that may be used.

The furnace also includes a stack 15 extending through the top thereof equipped with a damper 17 for adjusting the flow of combustion gases being discharged from the furnace. Mounted within the furnace by suitable means not shown is a battery 18 or a plurality of batteries, comprised of fuel cells 20 which are suitably interconnected so that fuel and oxidant gas may be introduced at one end of the battery, circulated through each of the cells and discharged from the other end of the battery. The detailed construction of each of these cells is described below. It is preferred to protect the burner from direct contact with the combustion gases emitted from the burner 12. In the example given here, a cup-like baffle 16 is provided around the battery 18 for this purpose. This prevents overheating of the fuel cells nearest the burner and underheating of those more remote.

The fuel supplied to the battery is conducted through the conduit 22 and preheat coil 23 which are located in the top section of the furnace in this example. The lower end of the conduit connects to the first fuel cell of the battery at the connection 74 (FIG. 3). Fuel passing through the coil 23 is heated prior to being introduced into the fuel cell by reason of its traverse through the upper portion of the furnace. The flow of fuel through the line 22, 23 is controlled by the valve 30 which opens and closes in response to a thermostatic element 32 mounted within the baffled portion of the furnace adjacent the battery 18. The thermostatic control 32 is adjusted to maintain the temperature desired for optimum operation of the fuel cells, namely, between 700° and 750° C.

A second valve 26, upstream of valve 30, is regulated by an automatic shut-off safety control including a thermostatic control unit 28 mounted in the wall of the furnace adjacent the burner. If for some reason the burner fails to ignite, the valve 26 closes so that the supply of fuel to the cells and to the burner 12 is cut off. A bypass line with manual valve 27 permits operation apart from automatic valve 26. Unreacted fuel is discharged from the battery 18 through the line 24 which connects to the burner 12.

Make-up fuel is supplied to the burner 12 through supply line 34. Valve 36 is provided in the supply line to regulate the flow of fuel. Such valve is operative in response to a thermostatic control 38 disposed in the furnace adjacent the battery 18.

The water required to make steam for the reforming and shift reactions carried on within the individual fuel cells is supplied through the orifice 42, a device capable of controlling the rate of flow of water to the heat exchanger 40 mounted within the furnace above the battery 18. A manually controlled valve 43 is included in the water line. Water passing through the heat exchanger 40 is rapidly converted to steam and is discharged into the line 22 at the junction identified by the numeral 44. Here the steam becomes entrained in the gaseous or vaporized fuel and is carried to the battery 18. The orifice 42 is chosen to provide the correct flow rate of water to produce the volume of steam required for the water gas reaction.

The oxygen electrode of the fuel cell is supplied with oxidizing gas, such as compressed air, from a fan, blower or compressor (not shown), through the conduit 46 and the heat exchanger 48. Orifice 49 is provided to regulate the flow rates of oxidant gas to the battery 18 and to the burner 12. The heat exchanger causes the gas to be raised to elevated temperature, thus insuring immediate reaction on introduction to the battery 18. The line 47 which carries heated oxidizing gas from the heat exchanger 48 to the battery 18 contains a flue gas inspirator 50. The flow of oxidizing gas through the orifice in the inspirator causes combustion gases produced by the burner 12 to be drawn into the tube 47 and introduced into the fuel cells. The combustion gases contain a large proportion of carbon dioxide. Carbon dioxide must be fed to the cathode in order to preserve the desired properties of the electrolyte as pointed out above. It will be noted that the flow of oxidizing gas through the fuel cells is countercurrent to the flow of fuel in this representation, but cocurrent flow can also be obtained by making the appropriate changes in piping.

A branch line 45 extending from the compressed air supply connects to the burner 12 to provide a portion of the oxygen required to burn the fuel. Orifice 51 controls the rate of flow through the branch line. Spent oxidant gas is discharged from the fuel cells through the line 52 to burner 12 to conserve some of the carbon dioxide and to take advantage of the inspirating action of the burner. Spent oxidant gas may also be discharged into the flue gas stream.

Leads 54, 56 from the battery connect to the load to be supplied with electrical energy. The inner ends of the conductors connect to the interconnected electrodes of the fuel cells.

Referring now to FIGURES 2 and 3, the fuel cell is designated generally by the numeral 20 and consists essentially of a central electrolyte 72 sandwiched between an anode 68 and a cathode 70, suitably housed within a metallic enclosure. The metallic enclosure consists of a spacer disk 75 having a relatively thin plate portion 81 terminating at its periphery in a relatively thick flange 76. The thickness of the flange is slightly reduced as indicated at 80 to accommodate the electrode sandwich. The reduction in thickness is sufficient so that the faces 80 of opposing disk members 75 are adapted to compress the electrode sandwich when assembled as illustrated in FIGURE 3. In other words the reduction in thickness of two adjoining disk members must be less than the thickness of the electrode sandwich.

Projecting from the surface of the central plate portion 81 of the disk are a series of baffles which take the form of integral fingers 62, 64 and 66. These project above the surface of the plate a sufficient distance to make pressure contact with the particular electrode surface adjacent thereto. It will be noted from FIGURE 2 that the fingers 62 and 66 project outwardly from one side of the flange member 76 while the finger 64 projects from the opposite side intermediate fingers 62 and 66. Each of the fingers stops short of the opposing wall, thereby providing a tortuous path for directing the flow of fluids through the fuel cell. This construction promotes intimate contact between the electrode and the fluid flowing through the cell, and mitigates bypassing of gases from inlet to outlet without passing over most of the electrode surface.

The flanges 76 comprising part of each disk 75 are provided with holes 78 equally spaced about the circumference of the disk. These holes 78 receive bolts or the like to facilitate clamping a plurality of disks and electrode sandwiches together to form a complete battery 18.

To facilitate connecting the interior of the fuel cell with the conduits for the reactants four screw threaded openings are provided in each disk. One inlet and one outlet at opposed points are provided on either side of the central plate. When a plurality of fuel cells are connected together to form a battery the first cell at one end is connected to the source of reactant and the last cell at the other end is connected to the discharge conduit. The intermediate cells are interconnected to form a continuous passage from the reactant inlet to the reactant outlet. It is also possible to introduce fuel and oxidant gases into each individual cell, but this multiplicity of feeder lines is not desirable in most practical applications.

It will be noted that the end disk 60 is of increased thickness and has protuberances or fingers on one side only. A similar end disk is provided at the other end of the battery.

The anodes 68 may be made from porous sintered nickel plates which may contain embedded gauzes or wires to provide strength at high temperatures. Other metals or semiconductive metal oxides may be formed into similar porous plates. Examples would include mixtures of nickel oxide and reforming promoters such as alumina or magnesia, in which the nickel oxide is entirely or partially reduced to nickel by treatment with a reducing gas such as hydrogen. Other examples would include porous cobalt anodes, or porous anodes composed of Raney nickel or cobalt alloys, activated by caustic treatment. Suitable anodes may also be formed by reducing plates of porous nickel or cobalt previously impregnated with thermally decomposable nickel salts, and fired in air. Further, metallic anodes can often be improved by alternate oxidation and reduction.

In general, useful anodes must be conductive or semiconductive materials with catalytic activity for steam reforming, CO shift, and hydrogenation reactions. Although other transition metal and metal oxide fuel electrodes can be used, nickel appears to have the most desirable properties for this application, since it is particularly efficient in catalyzing steam-hydrocarbon reforming and CO shift.

The cathode 70 may be made, for example, from porous sintered silver, lithiated NiO, silverized ZnO, or from silver gauze. In general, useful cathodes must be conductive or semiconductive materials, and good electron donors to oxygen. To form oxygen ions from oxygen gas, electrons must be transferred from the cathode to the adsorbed oxygen. If a semiconductive material is chosen for the cathode, it is preferable that it be a p-type semiconductor which conducts by way of positively charged electron "holes." When electrons are donated to oxygen, the number of holes will be increased and conductivity will thereby increase. It will be appreciated that conductivity must remain high if the material is to serve as an electrode to conduct electrons, as well as to serve as a material that will produce oxygen ions from oxygen gas. In the case of n-type semiconductors, there are generally a low number of electrons available for transfer to oxygen, or there is a low surface coverage of adsorbed oxygen. Further, if electrons are donated, this will result in an undesirable decrease in conductivity.

Good cathodes are not limited to semiconductors, and excellent cathodes can be formed from materials having low work functions for the removal of electrons. This facilitates the donation of electrons from cathode to oxygen. Work functions for the oxides of the Group I$b$ metals (copper, silver and gold) are low, and these oxides are active catalysts for the reactions at oxygen cathodes. In the case of oxides that are good electron donors to oxygen by virtue of low work functions, but do not have high enough conductivities for electrons to serve as practical electrodes, it is possible to utilize the corresponding metal cathode. In the case of oxides that are good electron donors to oxygen, and that are semiconductive but not conductive enough to serve as good electrodes, it is possible to increase conductivity by doping with small amounts of foreign ions of a different valence from the main constituents of the crystal lattice. An outstanding example is the substitution of lithium into p-type semiconductive divalent transition metal oxides, such as Mn, Co, Ni or Cu oxides. Introduction of as little as 2 to 5% lithium into the lattice can result in conductivities as much as a million times larger.

At the anode or fuel electrode, the chemisorption of cations rather than anions is involved, so it is recognized that the requirements will be in some respects opposite from those of the cathode. Thus, materials with high work functions and/or n-type semiconductive materials are of most interest. However, the anode like the cathode must have a high conductivity for electrons at all times.

The electrolyte 72 consists of a porous refractory disk or matrix, impregnated with mixtures of sodium, lithium and/or potassium carbonates. The purpose of the porous disk is to retain the molten electrolyte by surface tension, and MgO or other suitable inert, ceramic materials that can be sintered into strong, thin, porous matrices may be used. Although any molten carbonate or carbonate mixture may be employed, it is preferred to use mixtures of carbonates with lower melting points, such as the binary Li-Na carbonate eutectic (M.P. about 500° C.) or the ternary Li-Na-K carbonate eutectic (M.P. about 397° C.). It is also feasible to use quaternary mixtures of Li-Na-K-Ca carbonates which have even lower melting points.

It is also possible to use free or pasty carbonates as electrolytes, without the porous ceramic matrix. If free molten carbonates are used, the cell design must provide suitable retaining means to keep the liquid between the electrodes. Also, to prevent flooding of the porous electrodes, dual-porosity electrodes may be required. If pasty electrolytes are formed by mixing the carbonates with finely powdered inerts, such as thoria or magnesia, the necessity for dual-porosity electrodes can be avoided, but retaining means will still be required to contain the plastic or pasty material between the electrodes. The advantage of free or pasty electrolytes is in the higher conductivity to carbonate ions, about an order of magnitude higher.

Other alternative electrolytes are solid ionic oxides that have highly mobile oxygen ions in the crystal lattice. Examples would be zirconia, hafnia, thoria, and rare earth mixtures. The requirements for a useful solid oxide electrolyte would be a high transference number for oxide ion, with negligible electron or cation conductance, inertness to fuel and oxidant, and mechanical strength at operating temperatures. It will be recognized that if oxide electrolytes are employed, there is no necessity to mix carbon dioxide or combustion products with the oxidant gas stream.

In operating the apparatus shown in FIGURE 1 the fuel, which may be natural gas, methane, or other hydrocarbon including liquid hydrocarbons, is introduced to the uppermost fuel cell through the conduit 22. The conduit 22 discharges into the inlet 74 on the anode side of the fuel cell. Steam discharged from the heat exchanger 40 becomes entrained in the gaseous fuel, which for convenience will be described herein as methane. A ratio of 2 moles of steam per mole of methane is the stoichiometric requirement for completion of the reforming and shift reactions. However, this is not to be taken as a limiting steam/methane feed ratio. It is possible under certain circumstances for steam formed as a product of combustion of intermediate hydrogen to enter into the steam reforming and shift reactions. If a portion of the steam requirement for reforming and shift is supplied in situ from product steam, less feed steam is required after the reforming reaction is initiated. On the other hand, an amount of steam in excess of the stoichiometric requirements may be desirable under conditions where a high extent of methane feed utilization is desired. In that case, the excess steam will tend to convert most of the methane to hydrogen as a result of the chemistry of the reforming and shift reactions. This is favorable to high fuel utilization since hydrogen is the most electrochemically reactive fuel gas.

The overall reaction for conversion of methane with water vapor to hydrogen and carbon monoxide is endothermic, which means that the chemical energy content of the product hydrogen is higher than the chemical energy content of the methane. In the fuel cell the energy required to achieve this conversion can normally be supplied from heat released during the generation of electricity, as previously pointed out.

The unreacted methane, hydrogen and carbon monoxide is discharged from the battery through the line 24 and is burned at the burner 12 to supply heat to maintain the fuel cells at the proper reaction temperature, say between 700 and 750° C. Oxygen for the cathode is supplied from the line 47 which connects to the threaded opening 75$a$ at the opposite end of the battery so that preferably the oxygen flows countercurrent to the direction of the fuel flow. Carbon dioxide is inspirated at the venturi 50 in the proportions of about 0.05 mole of carbon dioxide per mole of oxygen to 2 moles per mole. If air is used as the oxidant gas the ratio of flue gas to air will normally be on the order of 1 to 1. The spent oxidant is discharged from the opposite end of the battery into the line 52 and thus to the burner 12.

The efficiency of the fuel cell appliance of this invention may be increased by using it in conjunction with a storage battery. The appliance may operate nearly continuously at high efficiency to charge the batteries when the power requirements are low. The appliance may be regulated by the battery voltage through a voltage regulator. A 0.8 kilowatt fuel cell, operated at 90% load factor by means of a storage battery, will supply a 5,000 kw. hour yearly electric load or a 13.7 kw. hour daily load at an average 15% electric appliance load factor. The fuel cell-storage battery system appears to have practical application in supplying power for homes with nothing more than a source of natural gas as the source of energy. The appliance, of course, in addition to generating electricity will produce sufficient hot water to meet household requirements.

From the foregoing description it will be appreciated that we have provided an appliance in which the reactants are supplied automatically to the fuel cells and the temperature required to maintain the reaction is automatically controlled by the flow of make-up gas and reactant gas fed to the appliance. Moreover, the appliance is rendered highly efficient by utilizing the waste heat in the furnace for preheating the fuel, the oxidant gas, and for converting the water to steam. The appliance operates very well using only a conventional supply of utility fuel gas and a supply of water. Other modifications in the construction of the appliance will occur to those skilled in the art without departing from the true spirit of the invention and the scope thereof as set forth in the appended claims.

We claim:

1. A compact unitary appliance for generating electricity from a source of hydrocarbon fuel gas outside the appliance which comprises a furnace, a gas burner for heating the interior of the furnace, a battery of interconnected fuel cells mounted within said furnace for converting said gas directly to electricity by electrochemical oxidation, gas conduit means connecting said gas source to said fuel cells, an oxygen conduit within said furnace and extending outside the furnace for connecting a source of oxygen to said fuel cells, a water conduit within said furnace for conducting water thereto, heat exchanger means to convert the water in said water conduit to steam, means within said furnace for connecting said water conduit to said gas conduit means intermediate said gas source and said fuel cells to mix steam with said gas, supply line means for conducting fuel to said burner, first valve means in said supply line means for regulating the supply of fuel to said gas burner, thermal control means mounted within said furnace for controlling said first valve means, a thermal control element mounted within said furnace adjacent said fuel cells, and second valve means responsive to said thermal control element disposed in the portion of said gas conduit outside said furnace for regulating flow of gas to said fuel cells.

2. The appliance of claim 1 which includes a baffle interposed between said battery and said burner to prevent direct contact of the fuel cells by the combustion gases of said burner.

3. The appliance of claim 2 which also includes a discharge conduit interconnecting said fuel cells and said burner to conduct spent gases and carbon dioxide to the burner for combustion and recycling of carbon dioxide back into the furnace.

4. The appliance of claim 1 which also includes an inspirator in said oxygen conduit within said furnace for drawing combustion gas from the interior of the furnace into said conduit for introduction with oxygen into said fuel cells.

5. The appliance of claim 1 in which said gas conduit means connects to said battery at one end and said oxygen conduit connects to said battery at the other end, whereby the oxygen delivered flows countercurrent to the steam gas mixture.

6. A compact unitary appliance for generating electricity from a source of hydrocarbon fuel gas outside the appliance which comprises a furnace, a gas burner for heating the interior of the furnace, a battery of interconnected fuel cells mounted within said furnace for converting said gas directly to electricity by electrochemical oxidation, said fuel cells having metal electrodes which catalyze the conversion of said hydrocarbon gas and steam to hydrogen within said fuel cells, baffle means in said furnace for preventing direct contact of the fuel cells by the combustion gases of said burner, gas conduit means connecting said gas source to said fuel cells, an oxygen conduit within said furnace connecting said fuel cells to a source of oxygen outside said furnace, an inspirator in said oxygen conduit within said furnace for drawing combustion gas from the interior of the furnace into said conduit for introduction with oxygen into said fuel cells, a water conduit within said furnace for conducting water thereto, heat exchanger means for converting the water to steam, means within said furnace for connecting said heat exchanger to said gas conduit intermediate said gas source and said fuel cells, a thermal control element mounted within said furnace adjacent said fuel cells, valve means responsive to said thermal control element disposed in said gas conduit for regulating flow of gas to said fuel cells, and a safety shutoff comprising a second thermal control element mounted within said furnace adjacent said burner, and a second valve means within said gas conduit outside the furnace responsive to said second thermal control means for shutting off the flow of gas through said gas conduit when the burner is not properly functioning.

7. A compact unitary appliance for generating electricity from a source of hydrocarbon fuel gas outside the appliance which comprises a furnace, a gas burner for heating the interior of the furnace, a battery of interconnected fuel cells mounted within said furnace for converting said gas directly to electricity by electrochemical oxidation, said fuel cells having metal electrodes which catalyze the conversion of said hydrocarbon gas and steam to hydrogen within said fuel cells, baffle means in said furnace for preventing direct contact of the fuel cells by the combustion gases of said burner, gas conduit means connecting said gas source to said fuel cells, an oxygen conduit within said furnace connecting said fuel cells to a source of oxygen outside said furnace, a water conduit within said furnace for conducting water thereto, heat exchanger means for converting the water to steam, means within said furnace for connecting said heat exchanger to said gas conduit intermediate said gas source and said fuel cells, a thermal control element mounted within said furnace adjacent said fuel cells, valve means responsive to said thermal control element disposed in said gas conduit for regulating flow of gas to said fuel cells, and a safety shut-off comprising a second thermal control element mounted within said furnace adjacent said burner, and a second valve means within said gas conduit outside the furnace responsive to said second thermal control means for shutting off the flow of gas through said gas conduit when the burner is not properly functioning.

References Cited in the file of this patent

UNITED STATES PATENTS

| | | |
|---|---|---|
| 2,581,650 | Gorin | Jan. 8, 1952 |
| 2,581,651 | Gorin | Jan. 8, 1952 |